Oct. 4, 1932.     R. TILING     1,880,586
FLYING ROCKET
Filed June 13, 1931

Patented Oct. 4, 1932

1,880,586

UNITED STATES PATENT OFFICE

REINHOLD TILING, OF OSNABRUCK, GERMANY

FLYING ROCKET

Application filed June 13, 1931. Serial No. 544,144.

The use of a parachute is known for throwing articles out of balloons, airships and the like. It is also known, to provide with tail fins drop bombs, which are thrown from airships, aeroplanes and the like. These tail fins are intended to cause a strong braking effect on the bomb body. This invention relates to a flying rocket with foldable tail fins, the feature of which consists in that the tail fins rise slightly outwards from the centre of the flying rocket and are hinged around an inclined rising line on the rocket body so that, during the propelled flight they serve as guide fins and, when changing into free fall over the point aimed at, become released and thus spread out and impart a torsion to the rocket body.

The object of the invention consists in producing a flying rocket which, after the driving rocket force has acted, arrives on the earth in parachute-like shape in as far as possible free vertical drop.

An embodiment of the invention is illustrated by way of example in the accompanying drawing in which.

Figure 1:
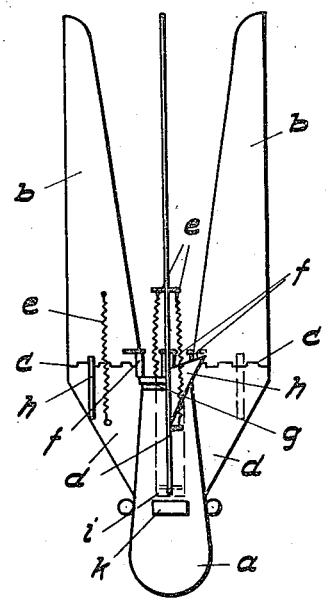
Fig. 1 shows the flying rocket with closed tail fins.

The flying rocket consists of an aircraft body proper $a$, on which the tail fins $b$ are arranged oscillatable around their axles $c$ on extension planes $d$ rigidly mounted on the aircraft body $a$. The hinge axles $c$ rise slightly in outward direction. The fins $b$ are connected with the extension planes $d$ by means of springs $e$. Slidable elements $f$ hold the fins in vertical position as shown in Fig. 1. These slidable elements bear in this position on a ring $g$ of the rocket proper which extends into the aircraft body. Struts $h$ mounted on the extension planes $d$ serve as stops and for supporting the fins $b$ in their spread position shown in Fig. 2.

The operation is as follows:

The flying rocket, after the ignition of the charge, rises like a projectile with the fine in folded position shown in Fig. 1. When the rocket charge has finished its action or the flying rocket has reached the desired height and position, a recoil charge indicated by $i$ in Fig. 1 is ignited either automatically or by the pilot, so that the rocket case accommodating the charge and the ring $g$ are thrust out towards the rear.

Figure 2:
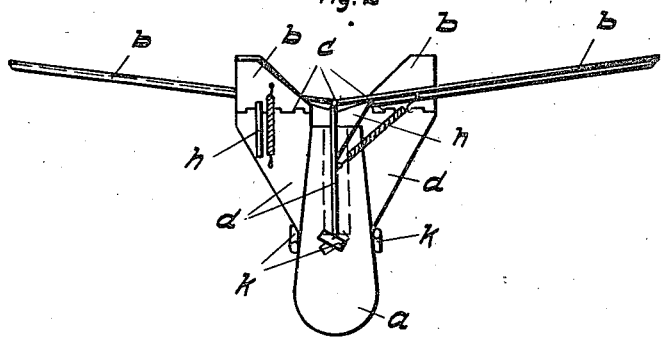
Fig. 2 shows the rocket with spread tail fins.

This ring $g$ bearing against the slidable locking plates shifts the same over the point of articulation of the fins $b$, and the springs $e$, then pull automatically the fins into the approximately horizontal spread position shown in Fig. 2. The flying rocket then commences its free fall, the fins $b$ retarding the flight like a parachute. This retardation is increased in that a high torsion of the flying rocket occurs, owing to the tail fins being adjusted to the bearing angle, so that the flying rocket only drops slowly to earth. In order to completely or entirely stop the drop shortly before the rocket comes into contact with the ground, rocket aggregates $k$ are also connected to the flying rocket and may be arranged inside thereof or on the outer edge of the body, so that they discharge tangentially outwards, namely in opposite direction to the direction of rotation of the flying body. These aggregates became operative shortly before the rocket reaches the ground so that a lifting force acting in opposition to the free fall is produced owing to the increased torsion of the flying rocket.

The flying rocket according to the invention is intended particularly for conveying dispatches, it being possible by employing time fuses and the like, to accurately set to the desired path of flight and then, after the combustion of the charge, that is on reaching the goal in the air, for the flying rocket to descend slowly, as possible vertically to the ground. Instead of the automatic adjustment the pilot can regulate the discharge periodically for the reversing of the fins and the like.

I claim:

1. A flying rocket, comprising in combination with the body, lateral extension planes on said body, axles one on the rear end of each of said planes extending transversely to the longitudinal plane of said body, tail fins hingedly mounted one on each of said axles adapted to assume a position in substantially horizontal plane and to act like supporting planes when the rocket is falling.

2. A flying rocket as specified in claim 1, in which the tail fine in spread position rise slightly in outward direction from the centre of the rocket, are hinged slightly on a rising incline so that during the falling the rocket slowly returns to earth, owing to torsion produced by the parachute-like retardation and rising incline.

3. A flying rocket as specified in claim 1, comprising in combination with the rocket body, rocket aggregates connected with said body arranged tangentially in outward direction adapted to discharge in the opposite direction to the direction of rotation of the flying rocket and to stop the free fall of the rocket before it comes into contact with the ground.

In testimony whereof I affix my signature.

REINHOLD TILING.